Sept. 6, 1966 C. W. ATTWOOD 3,270,478
BUILDING CONSTRUCTION

Filed Sept. 20, 1960 7 Sheets-Sheet 1

INVENTOR
CHARLES W. ATTWOOD
ATTORNEYS

Sept. 6, 1966          C. W. ATTWOOD          3,270,478
BUILDING CONSTRUCTION
Filed Sept. 20, 1960                     7 Sheets-Sheet 3

INVENTOR.
CHARLES W. ATTWOOD
BY
ATTORNEYS

Sept. 6, 1966 C. W. ATTWOOD 3,270,478
BUILDING CONSTRUCTION
Filed Sept. 20, 1960 7 Sheets-Sheet 4
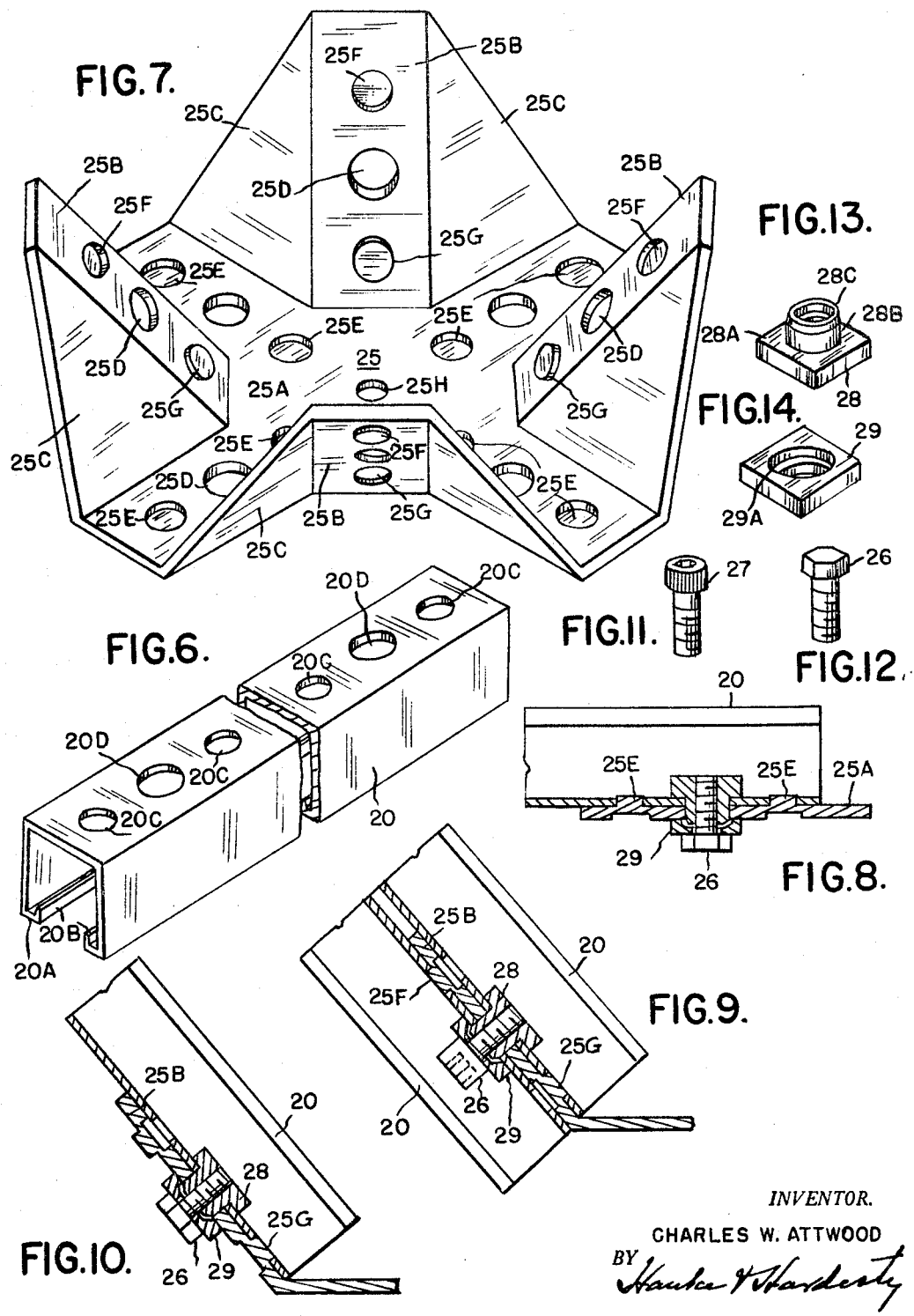
INVENTOR.
CHARLES W. ATTWOOD
BY
ATTORNEYS Sept. 6, 1966  C. W. ATTWOOD  3,270,478
BUILDING CONSTRUCTION Filed Sept. 20, 1960  7 Sheets-Sheet 5

INVENTOR.
CHARLES W. ATTWOOD
BY
Hauke & Hauke
ATTORNEYS

Sept. 6, 1966  C. W. ATTWOOD  3,270,478
BUILDING CONSTRUCTION
Filed Sept. 20, 1960  7 Sheets-Sheet 6

INVENTOR.
CHARLES W. ATTWOOD
BY
*Hauke & Hauke*
ATTORNEYS

Sept. 6, 1966 C. W. ATTWOOD 3,270,478
BUILDING CONSTRUCTION
Filed Sept. 20, 1960 7 Sheets-Sheet 7

INVENTOR.
CHARLES W. ATTWOOD
BY
*Hauke & Hauke*
ATTORNEYS

United States Patent Office 3,270,478
Patented Sept. 6, 1966

3,270,478
BUILDING CONSTRUCTION
Charles W. Attwood, 4118 S. Wayne Road,
Wayne, Mich.
Filed Sept. 20, 1960, Ser. No. 58,874
19 Claims. (Cl. 52—648)

The present application is a continuation-in-part of my copending application Serial No. 481,748, filed Jan. 14, 1955, now abandoned.

The present invention relates to construction systems and more particularly to a new metallic "space frame" construction system having load-carrying structural capacity.

The central problem confronting architects, engineers, builders, contractors and manufactures in today's economy is that of enabling the owner to obtain more for his building dollar. The search for a solution has taken many paths, such as through paring of costs of labor and material, through improvements in work-site planning, and through making use of more skillful architectural planning which permits a more economical use of materials and space. Carried too far, however, these approaches may be self-defeating since they lead to skimping on materials and sacrificing of space.

My approach puts emphasis on higher standards of building design and performance, providing more quality at less cost, by the development of a standardized system of space frame construction involving the use of lightweight, interchangeable parts of high quality, manufactured to closer tolerances than has ever before been attempted in this type of structural material, and that can be assembled at very low cost even by relatively inexperienced workmen to form structures varying greatly in design and capable of being readily disassembled, altered or expanded to meet changing needs of the owner or user.

The present space frame construction system is an outgrowth of framing systems I have previously developed; namely, that of incorporating a metal strut or channel, a spring nut, a bolt, and a variety of fittings including different types of connector plates and angles, brackets, hangers, clamps, roller supports, and concrete inserts, with which all types of shelving, racks, partitions, framing, scaffolds, and the like may be constructed.

It seemed feasible to me that this framing system could be redeveloped into a flexible type of structural framework well suited for many different types of buildings, pavilions, trusses, structural spans and the like. In fulfilling the initial conception, it became necessary to develop a type of "space frame" which would meet not only requirements of structural flexibility, standardization and high quality, but which would be capable of carrying large loads and could be engineered to form spaces of varying sizes and shapes instead of being limited to certain overall fixed dimensions as is the case with conventional structures.

A "space frame" has been described as a structure in which forces act in three or more directions in space. To adapt my basic framing system to this type of structure, attention was focused on the development of a new type of truss structure using four substantially standardized basic parts; namely, fixtures, struts, bolts and nuts. The heat of these four basic parts is a preformed universal fixture having accurately located seats with accurate strut locating and securing means.

The space frame system is herein shown and described as applied to roof span construction, and it is also used as a floor and for other structures. Heretofore, trusses and the like used in such structures were either welded together and carried to the construction site, or were assembled by welding, riveting or bolting on the construction site from specified parts which individually were adapted for only one specialized use and had to be altered as necessary as construction progressed.

The present space frame system overcomes the difficulties encountered heretofore by utilizing lightweight, easily handled modular parts which, since they are manufactured in large quantities made possible by my new concept, are of such accurate dimensions that interchangeability is the rule rather than the exception. The precision with which parts are made in the factory insures speed and accuracy in assembly. They arrive on the site prefinished and are readily joined together. Workmen do not have to use tapes or squares, and the simplicity of assembling even permits the employment of relatively unskilled workmen.

Although the general appearance of the space frame idea involved here is known to have been contemplated before from the mere geometry viewpoint or as purely theoretical concepts, such as in the patent to H. H. Thomas, No. 2,433,677, I believe that never has this geometry been practically accomplished in a full-scale fashion, with engineering and architectural principles so embodied in an overall plan as to provide the necessary flexibility and the actual working utility that is presently possible with my invention.

Among the objects of the present invention is to advance the art of building construction by providing a new type of space frame structure capable of being erected by unskilled labor, using only a few simple tools of widespread possession and use, the structure consisting of elements of relatively light weight which are easily handled without machinery, and in which the system has a minimum number of different elements.

Another object is to produce new metallic frame structures by providing preformed universal strut-connecting fixtures having strut seats connected by inclined reinforcing and locating gussets, and in which the strut seats are provided with accurately dimensioned and located lugs and apertures, said fixtures being connected to each other through a plurality of similar channels by means of nuts and bolts so that the entire frame structure may be, if desired, dismantled and again reassembled without the necessity of discarding or replacing a single piece.

Another object is to facilitate the assembly of metallic frame structures by providing a plurality of only a few different elements none of which requires modification or adaptation in the process of construction.

A further object of the invention is to facilitate the construction of floors, roofs, trusses, arches and other structures by providing a new and simplified system of assembly utilizing precision manufactured parts adaptable for modularized and interchangeable construction.

Yet another object of the invention is to introduce new architectural principles in the development of space frames by providing simplified modularized factory produced fabrication units pre-engineered with load supporting and stress-transmitting capabilities inherent in standardized parts and capable of complete assembly on the construction site.

For a more complete understanding of the invention, reference may be had to the accompanying drawings illustrating preferred embodiments of the invention in which like reference characters refer to like parts throughout the several views and in which FIG. 1 is a general diagrammatic perspective view of a portion of a space frame structure.

FIG. 6 is a perspective view of one of the preferred channel members used.

FIG. 7 is a perspective view of one modification of the connector plates or fixtures utilized in the present system.

FIG. 8 is a longitudinal fragmentary section showing a joint between the elements of FIGS. 6 and 7 when the channel member acts as a chord.

FIGS. 9 and 10 are fragmentary sectional views of such a joint showing respectively a double strut, and a single strut modification.

FIGS. 11 and 12 show preferred forms of bolts used.

FIG. 13 is a perspective view of a preferred nut used with the bolts of FIGS. 11 and 12.

FIG. 14 is a perspective view of a preferred washer used with the aforesaid bolts and nut.

Figure 1:
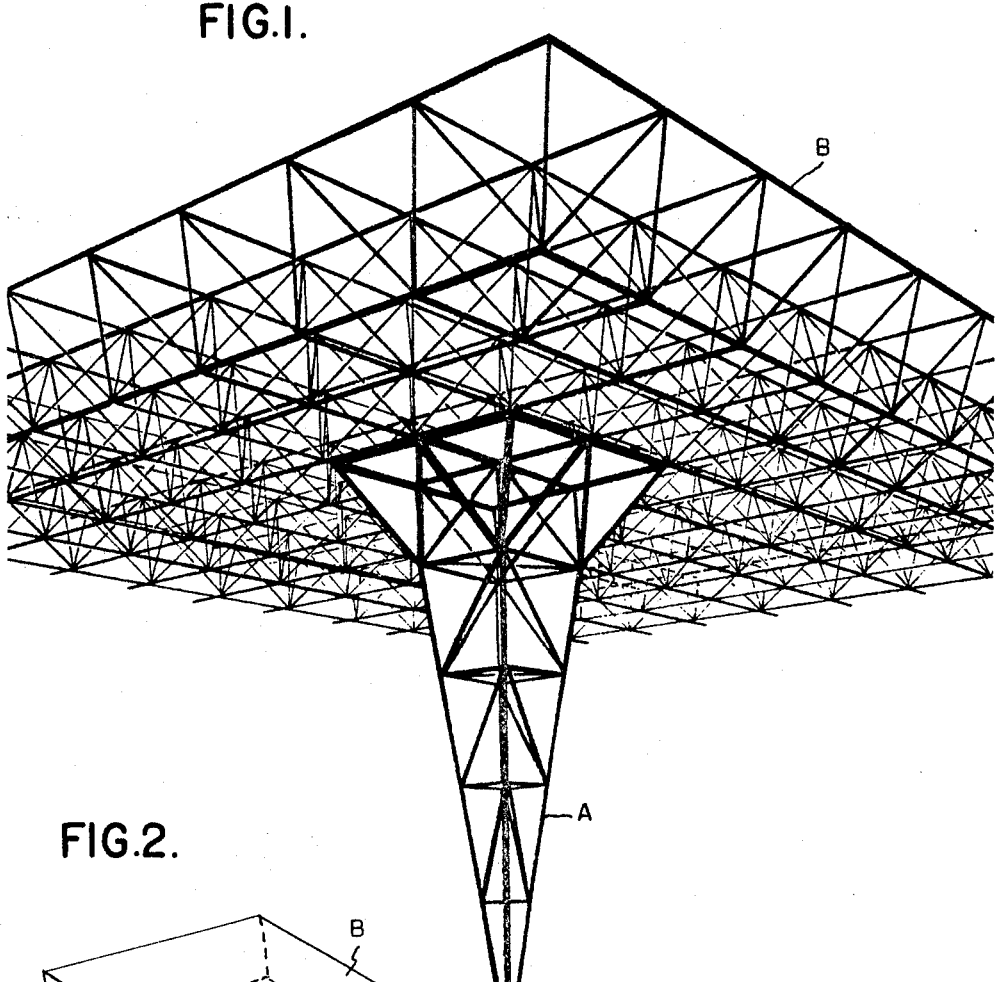
Figure 2:
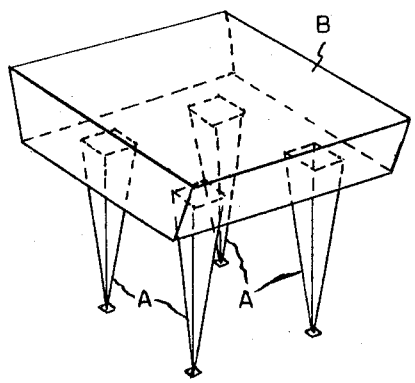
FIG. 2 is another diagrammatic view showing how several of the portions shown in FIG. 1 are put together to produce a complete laterally stable space frame.
Figure 3:
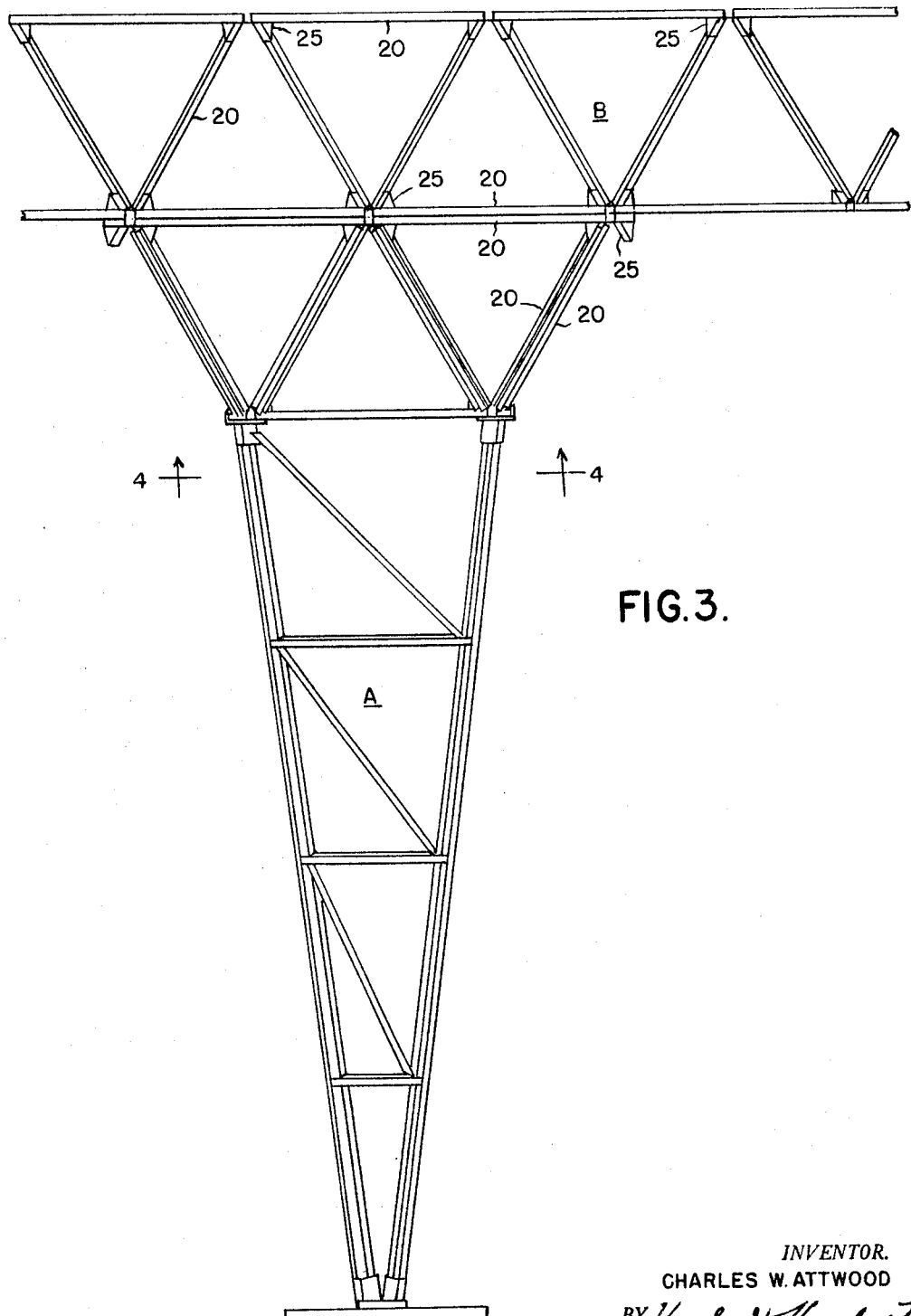
FIG. 3 is an enlarged view in elevation of a portion of the structures of FIG. 1.

As illustrated in FIGS. 1 to 3, the present invention comprises a space frame structure B which, when used under certain circumstances, is supported by a column structure A, herein designated as a "nine-point" column. The space frame B may extend in any direction and be of any preferred size and shape and may be supported as indicated in FIG. 2 by a plurality of columns A' or other structures.

The space frame structure B comprises an upper chord frame structure B¹ and a lower chord frame structure B² spaced by an intermediate web structure B³, as indicated in FIG. 3.

Each chord frame structure and the web structure is assembled from a plurality of struts 20 which are each preferably channel shaped as illustrated in FIG. 6, its side walls being turned in at right angles as at 20A and the edge portions again turned in at right angles at 20B so as to provide a longitudinal slot between the inturned edges or flanges. Channel of this character is well known and marketed under the trade name of "Unistrut."

The struts 20 as used in the present structure are usually provided with openings 20C and 20D in the bottom wall of the channel adjacent each end, the openings 20D being somewhat larger and being between the openings 20C.

The upper and lower chord frame structures B¹ and B² also comprise a plurality of junction plates or fixtures 25, one modification being shown in FIG. 7. This fixture 25 consists of a horizontal or plane portion providing a plurality of spaced coplanar seats 25A and spaced seats 25B extending upwardly at an angle and joined to the edges of the seats 25A by reinforcing and locating inclined gussets 25C. In each of the seats 25A and in each of the angled seats 25B is an opening 25D of about the same size as the opening 20D in the strut 20. Spaced from the openings 25D radially of the center of the fixture 25 are circular coined projections 25E and 25F having the same radius as the openings 20C in the strut 20 and of a height equal to or greater than the thickness of the metal of the strut 20. All of the projections 25E on the seats 25A project outwardly of the fixture as viewed in FIG. 7, as do the projections 25F in the angled seats 25B.

The projections 25E in the angled seats 25B which are radially inward from the openings 25D, project in the opposite direction; that is, upwardly or inwardly. The spacing between the openings 25D and the adjacent projections is the same as the spacing between the openings 20C and 20D in channel member 20. Moreover, the openings and projections of all the seats are accurately and uniformly dimensioned and located with respect to each other.

The fixture 25 when viewed in plan is polygonal and has at its center an opening 25H.

In FIGS. 11 to 14 are shown preferred bolts, nut and washer used in fixing the parts together.

FIGS. 11 and 12 show two forms of a screw 27 and 26, both conventional, and either of which may be used.

FIG. 13 shows a view of a nut 28 having a wide head portion 28A and a sleeve portion 28B around the tapped opening. The end of the sleeve is preferably tapered or rounded as at 28C and the length of the sleeve is determined by location of its use. In other words, the nuts will be produced with two different lengths of sleeve, the purpose of which will appear later herein.

In FIG. 14 is shown a special washer 29 having the opening therethrough flared on one side as indicated at 29A.

As mentioned above, the space frame structure is produced by bolting the channel struts 20 to the junction plates or fixtures 25, preferred connections being shown in section in FIGS. 8, 9 and 10.

In FIG. 8 is shown a connection wherein the member 20 acts as a chord in the upper or lower chord frame structure. In this figure, the planar portion seat 25A of a junction plate 25 acts as a seat for a channel strut 20 with the opening 20C of the latter fitting over the projections 25E of the fixture, and the two elements are secured together by inserting the sleeve 28B of nut 28 through the openings 20D and 25D, and inserting a screw 26 or 27 with a washer 29. The sleeve extends through both elements and into the flared opening or recess in the washer, there being sufficient clearance to permit drawing the parts tightly together.

In FIG. 9 there is shown a joint where it is desirable to have greater strength when higher stresses are encountered, two members 20 being used in parallel. In this figure, showing an angled seat 25B of the fixture 25, two struts 20 are arranged back to back with the portion 25B interposed to act as a seat for both. In this case, one opening 20C in a strut 20 fits over an inward projection 25E and the other member 20 has its opening 20C fitting over an outward projection 25F. In this joint, the nut 28 has a sleeve 28B sufficiently long to project through the several parts and be fixed by a screw 26 or 27 and washer 29.

In FIG. 10 is shown only a single strut 20 secured to one angled seat 25B. In this case only one of the projections is used.

In producing the structure indicated, the struts 20 are bolted to the fixtures 25 in the manner indicated in FIGS. 8, 9 and 10, the chord frame structure struts 20 being fixed to the plane under surfaces of the fixture seats 25A as viewed in FIG. 7 and the web structure struts being fixed to the inner surfaces of the angled seats 25B. The fixture 25 as viewed in FIG. 7 is inverted when used in the upper chord frame structure. Adjacent the point of support, that is, over a column A or other support member, the struts of the webs are preferably double by bolting two of the struts 20 to each of the fixture seats, one on each surface.

Figure 4:
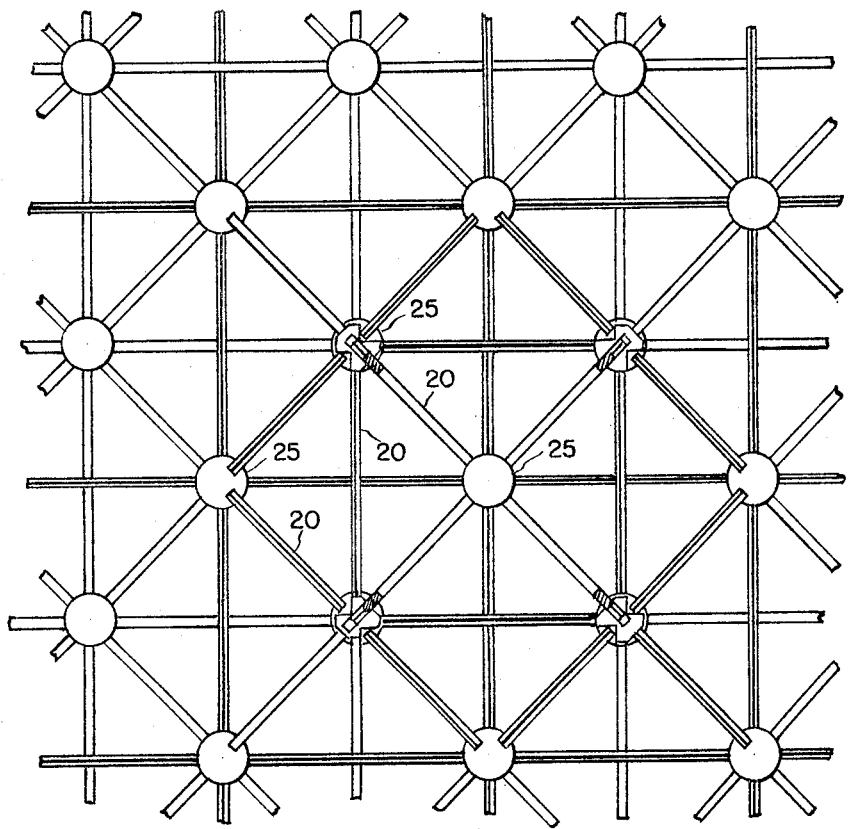
FIG. 4 is a view taken substantially on the line 4—4 of FIG. 3.
Figure 5:
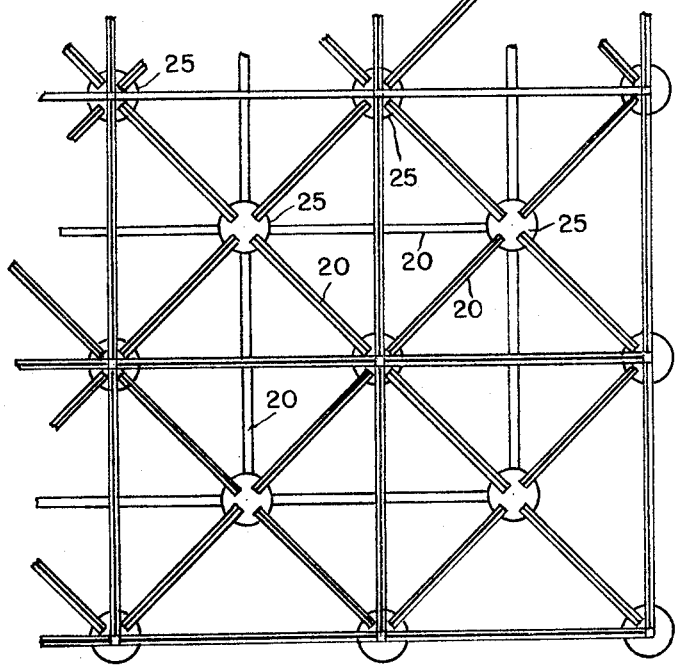
FIG. 5 is a fragmentary plan view from the top of FIG. 3.

As shown in FIGS. 4 and 5, the channels of the lower chord frame structure are open downwardly and those of the upper chord frame structure are open upwardly.

When all of the struts 20 are of the same length and when all of the fixtures 25 are the same, with all of the bolt openings and lugs or projections accurately located, no selection of parts or pieces need be made, since any strut 20 or any fixture 25 may be used for any joint and without measuring or squaring since all dimensions are accurate and uniform.

Fixing such elements together as indicated produces a space frame span in which the chord frame structures are in parallel planes and the struts are all arranged in squares with the intersections in one plane being vertically opposite the centers of the squares in the other plane. As the intersections in one plane are joined to those in the other plane by the diagonally arranged web struts, the resulting structure, in effect, consists of a plurality of four sided pyramids set together right side up and upside down with all edges of the same length.

In my preferred space frame arrangement, a single fixture accommodating eight struts is used with each strut secured by a single bolt. Further, by forming and accurately locating the lugs or projections on the seats of the fixture by coining without shearing, a single bolt insures perfect alignment and full strength, and eliminates the necessity for a plurality of bolts, although if desired, more than one bolt could be used instead of using the coined projections.

The form of nut shown in FIGS. 8 to 14 has two functions. The large head or flange portion serves to hold the strut 20 tightly against the fixture 25 and prevents its binding, while the sleeve portion assists in alignment of the parts and when finally in place, cooperates with the projections to transmit substantially all shear stresses and leaves to the bolt the function mainly of clamping the parts together.

Because of the fundamental simplicity of the present concept, space frame structures of various sizes may be assembled accurately and rapidly in the field, without measuring tapes or squares. Structural precision assures a corresponding saving in site labor costs.

Since the present system comprises elements preferably manufactured to very small and precise tolerances—preferably less than five-thousandths of an inch—individual pieces are always easy to install, and the system becomes self-aligning, self-squaring, self-leveling, and self-measuring.

Determination of structural behavior, particularly in space frame assemblies with varying roof overhangs and varying spans between columns, has been a major research objective. To obtain basic data needed for the calculation of safe loads, a series of full-size space-frame tests and experiments were performed, which confirm the co-operative nature of space frame theories and show that the present space frame assembly has unusual strength in relation to its weight. When a critical member in a roof structure, for example, reaches its maximum load carrying capacity, it does not collapse but transfers additional load to neighboring elements and they in turn pass it on to others, so that the entire structure tends to act as a single three-dimensional unit. Moreover, instead of requiring different securing or joining means for the various members, depending on the type and direction of forces to be encountered, as heretofore has been done, the present similar connections are pre-engineered to transmit compression, tension and torque forces with adequate safety margins.

Yet the whole unitized structure is inherently resilient to a high degree for absorbing loads of unusual wind and storm conditions as well as earth tremors and fatigue producing vibrations.

FIGS. 15, 16, 17 and 18 illustrate in diagramatic form various types of supporting columns which are readily interchangeably constructed to carry space-frame roofs B, depending on engineering load determinations. It will be apparent of course that wall structures of many types may be used instead if these are desired.

Figure 15:
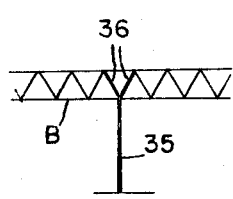
FIG. 15 is a diagram illustrating a "one-point" column structure which may be used with the present system.

FIG. 15 illustrates a one-point stud column 35 supporting the space-frame B. The four diagonal web channels 36, indicated by heavy lines, which meet at the fixture to which the column 35 is secured are preferably double channels or struts as previously described, since they must transmit the greatest stresses.

Figure 16:
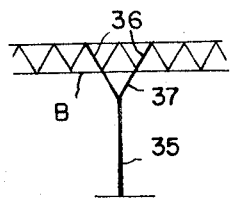
FIG. 16 is a diagram illustrating a "four-point" column structure.

FIG. 16 illustrates a four-point stud column composed of the single stud 35 but having an upper four-piece web structure 37 supporting the space-frame B at four points. The four diverging diagonal web channels 36 in this structure, indicated by the heavy lines, which connect to the four fixtures to which the studs 37 are secured, are preferably doubled.

Figure 17:
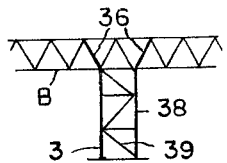
FIG. 17 is a diagram illustrating another "four-point" column structure.

FIG. 17 illustrates a four point square column composed of four studs 38 interconnected by cross-members 39 and supporting a space frame B having the same doubled web struts 36 as are shown in FIG. 16.

Figure 18:
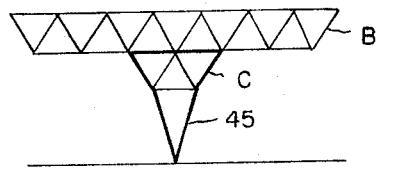
FIG. 18 is a diagram illustrating a "nine-point" column structure.

FIG. 18 illustrates generally the use of a nine-point pyramidal column similar functionally to that shown in FIGS. 1 and 3 and comprising four upwardly diverging strut members 45 connected at their lower ends and, as shown in FIG. 3, having lateral and diagonal connecting cross-members 46 and 47 respectively. Mounted on top of the struts 45 is a column cap assembly C having four lower fixtures 25 such as are used in the basic space frame structure, these fixtures being connected to the upper ends of the struts 45 by intermediate column cap fixtures 45A. Diverging upwardly are struts 20 such as have previously been described. These struts are connected to nine fixtures 25 connected back to back with nine lower chord frame fixtures.

In effect, the cap assembly C is a portion of space frame adapted to concentrate the load from nine points of the basic space frame B to the four struts 45 of the column A.

Figure 18B:
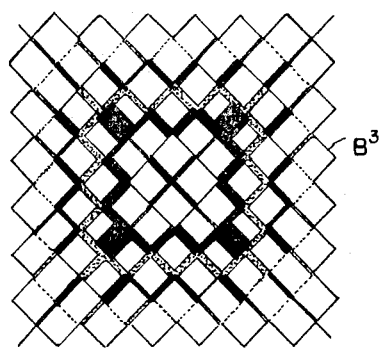
FIG. 18B is a typical stress plan illustrating distribution of forces in the web portion of the structure.
Figure 18A:
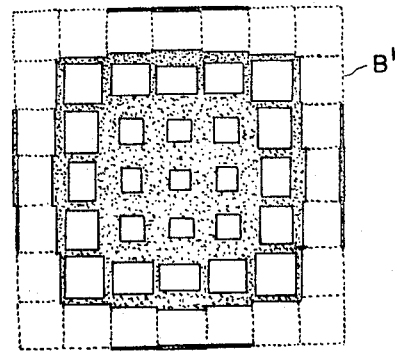
FIG. 18A is a typical stress plan illustrating distribution of forces in the upper chord portion of a space frame structure when supported by a single "nine-point" column.
Figure 18C:
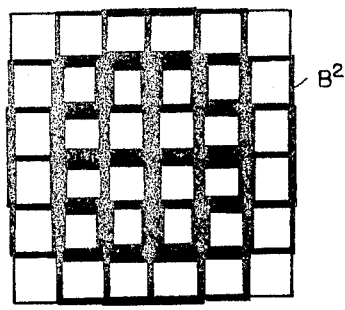
FIG. 18C is a typical stress plan illustrating distribution of forces in the lower chord portion of the structure.
Figure 19:
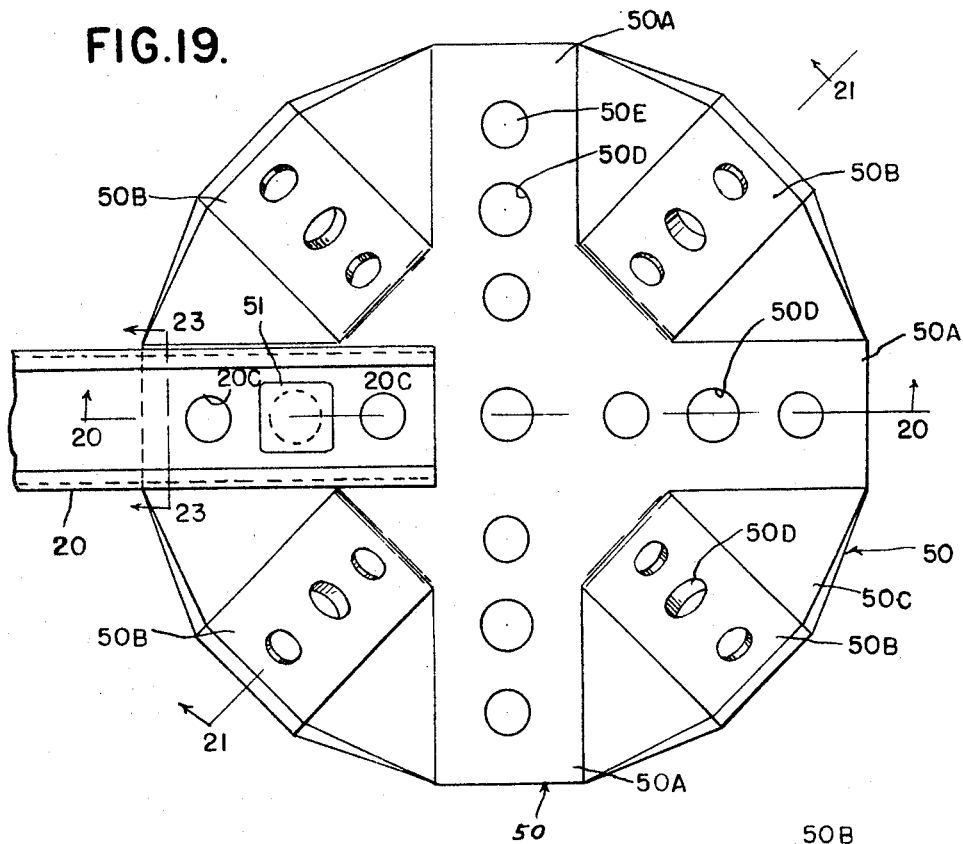
FIG. 19 is a top plan view of another type of fixture structure.

FIGS. 18A, 18B and 18C illustrate graphically the stresses in a typical space frame structure B supported on the 9-point column A. Stippled lines represent tension while solid lines represent compression. The thickness of the lines indicates the relative magnitude of stress resulting from a uniformly distributed roof load. FIG. 18A indicates the stresses of the upper chord frame structure $B^1$, FIG. 18B shows stresses of the web structure $B^3$, and FIG. 18C illustrates stresses on the lower chord frame structure $B^2$.

As will be apparent, in the present space frame structure, due to uniformity in the modular package which provides a single integrated unit, loads are transmitted to supporting structures more efficiently than with conventional 2-dimensional trusses and beams.

When parallel walls (not shown) are used to support a space frame structure, the stress pattern under a distributed load resembles that of a one-way reinforced concrete slab. Although stresses spread out in various directions, they tend to follow direct paths to the walls.

When peripheral walls (not shown) are used, the stress pattern resembles that of a 2-way reinforced concrete slab. Stresses follow the space-frame configuration instead of being concentrated in direct paths to the walls.

Columns or point supports, on the other hand, as indicated in FIGS. 18A, 18B and 18C, will cause the space frame structure to behave very much like a flat plate supported directly on columns with no beams.

It has been found that in all cases, after the ultimate capacity of space-frame members in a particular path has been reached, stresses due to additional loads will bypass this path and follow other neighboring paths until finally the entire space frame structure is acting to its full capacity, thus achieving maximum cooperation of all individual members for supporting large loads. Yet the bulk and weight of the structure is relatively low as compared with other more conventional structures.

FIGS. 19 through 23 illustrate the construction and use of a modified fixture 50 having the same general configuration of the fixture 25 of FIG. 7 and comprising a plurality of co-planar seats 50A and angularly disposed seats 50B connected by inclined gussets 50C. In each of the seats 50A and 50B is a hole or bolt receiving aperture 50D, and spaced therefrom on either side are coined projections 50E. However, these coined projections, two on each seat, extend in the same direction. In FIGS. 19–23 they extend inwardly, and these fixtures would be used in either the upper or lower chord frame structure. In the other chord frame structure the coined projections would all extend outwardly.

Two differing channels may be used with the fixture 50. Channels 20, the same as have been described, may be bolted to any seat with the projections 50E engaged in both of the holes 20C of the channel. The use of two such connections, in conjunction with a bolt 51, provides for increased resistance to the tension, compression and torque loads imposed on the struts 20.

Figure 20:
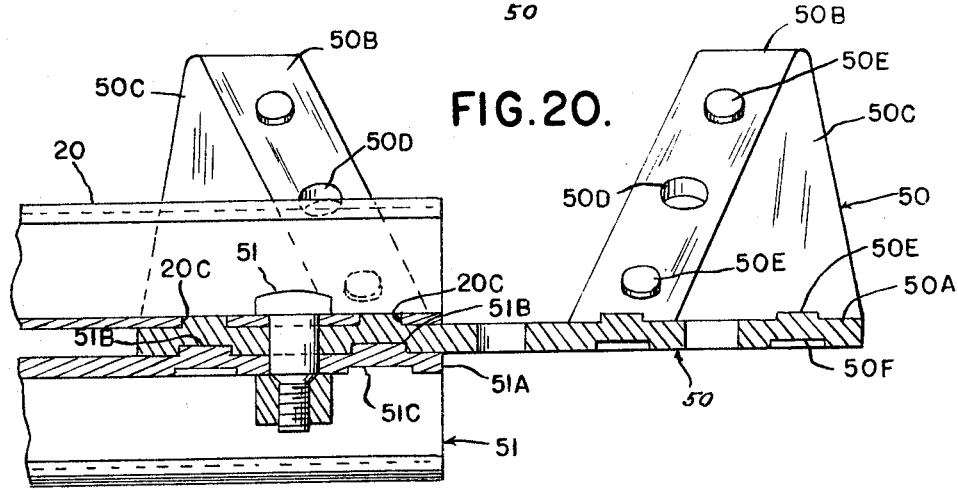
FIG. 20 is a cross-sectional view taken substantially on the line 20—20 of FIG. 19.
Figure 21:
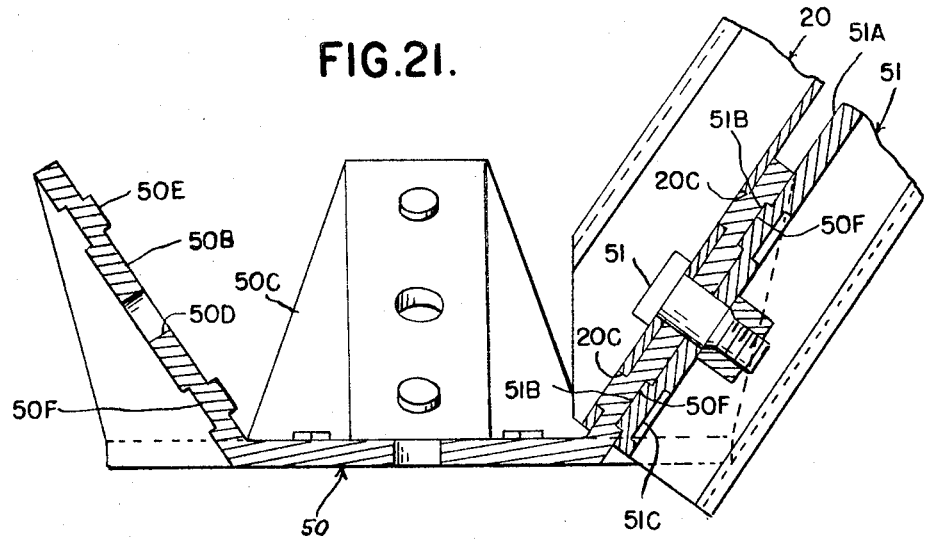
FIG. 21 is a cross-sectional view taken substantially on the line 21—21 of FIG. 19.
Figure 22:
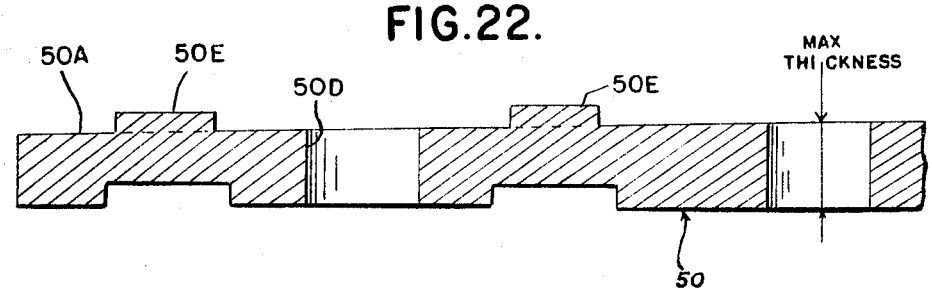
FIG. 22 is a fragmentary enlarged cross-sectional detail view of the fixture of FIG. 19.

In some locations in the structure, as previously indicated, it is necessary to use double channels, and for this purpose a channel 51, FIGS. 20 and 21, is connected on that side of the seat 50A or 50E which has, instead of the projections 50E, the recesses 50F which remain after the projections 50E are formed. It will be noted that the recesses 50F are larger in diameter than the projections 50E, leaving adequate connecting material so that there will be no tendency of the coined projection to shear or twist out on the peripheral line. In order to prevent undesirable deformation of the surrounding material, the volume of the recess 50F must be the same as the volume of the corresponding projection 50E.

It may also be noted that in forming the fixtures, greater load carrying capacities are achieved by making the central or base portion of the fixture of slightly greater thickness than the seats and gussets which are otherwise of substantially uniform thickness. This is shown in the enlarged illustration of FIG. 22.

Figure 23:
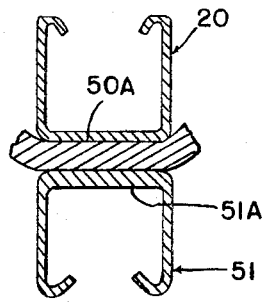
FIG. 23 is a fragmentary cross-sectional view taken substantially on the line 23—23 of FIG. 19.

The channel 51 is provided with a base web 51A which is approximately double the thickness of the base web of the previously described channel 20 and of the remainder of the channel 51, as shown in FIGS. 20, 21 and 23. This provides sufficient material for the forming of coined projections 51B of the same diameter and height as the recesses 50F. In forming the projections 51B, it is again necessary to make the corresponding recess 51C of the same volume but of a larger diameter than the projection 51B.

There is thus provided a double channel strut assembly in which each channel is connected to the fixture by a bolt and two coined projections rather than merely one as in the modification of FIG. 9.

It will thus be seen from the foregoing description that a new system of space frame construction has been achieved by providing a small number of different parts, accurately engineered; namely, interchangeable struts dimensioned to close tolerances connected by preformed interchangeable strut-connecting fixtures having strut seats connected by inclined reinforcing and locating gussets, and with the strut seats provided with accurately dimensioned and located connecting means, the whole space frame and the parts therefore being engineered for infinite variations of load supporting capabilities so that a great variety of different structures may be assembled.

I claim:

1. A building construction comprising a skeletonized structure consisting of a multiplicity of identical channel members bolted at their ends to identical junction plates and arranged to form alternate erect and inverted square pyramids, the base members of the pyramids forming chords in parallel planes and the inclined edges forming web members or struts, each strut constituting an edge of two adjacent pyramids, all eight edges of which are of equal length and said channel members in the parallels planes being arranged with their open sides outwardly of the structure.

2. A junction plate for skeletonized structures comprising a plurality of flat surfaces extending radially from a central point, said surfaces being equispaced with alternate surfaces being in a single plane while the other surfaces are sloped upwardly, said surfaces being connected by inclined webs, each of said surfaces being provided with a pair of longitudinally spaced projections, those projections on the surfaces in the plane both extending downwardly and those on the sloped surfaces extending in opposite directions.

3. A junction plate for skeletonized structures comprising a plurality of flat surfaces extending radially from a central point, said surfaces being equispaced with alternate surfaces being in a single plane while the other surfaces are sloped upwardly, said surfaces being connected by inclined webs, each of said surfaces being provided with a pair of longitudinally spaced projections, those projections on the surfaces in the plane both extending downwardly and those on the sloped surfaces extending in opposite directions, each of the surfaces being also provided with an opening between and equidistant from the said projections.

4. In combination a junction plate for skeletonized structures comprising a plurality of flat surfaces extending radially from a central point, said surfaces being equidistant with alternate surfaces being in a single plane while the other surfaces are sloped upwardly, said surfaces being connected by inclined webs, each of said surfaces being provided with a pair of longitudinally spaced projections, those projections on the surfaces in the plane both extending downwardly and those on the sloped surfaces extending in opposite directions, and a channel member fixed thereto and provided adjacent its ends with openings accurately dimensioned and spaced to fit snugly over said projections.

5. In combination a junction plate for skeletonized structures comprising a plurality of flat surfaces extending radially from a central point, said surfaces being equidistant with alternate surfaces being in a single plane while the other surfaces are sloped upwardly, said surfaces being connected by inclined webs, each of said surfaces being provided with a pair of longitudinally spaced projections, those projections on the surfaces in the plane both extending downwardly and those on the sloped surfaces extending in opposite directions, each of said surfaces being also provided with an opening between and equidistant from the said projections and a channel member fixed thereto and provided adjacent its ends with openings accurately dimensioned and spaced to fit snugly over said projections, and with an intermediate opening registering with the opening in a flat surface.

6. In combination a junction plate for skeletonized structures comprising a plurality of flat surfaces extending radially from a central point, said surfaces being equispaced with alternate surfaces being in a single plane while the other surfaces are sloped upwardly, said surfaces being connected by inclined webs, each of said surfaces being provided with a pair of longitudinally spaced projections, those projections on the surfaces in the plane both extending downwardly and those on the sloped surfaces extending in opposite directions, each of said surfaces being also provided with an opening between and equidistant from the said projections and a channel fixed thereto and provided adjacent its ends with openings accurately dimensioned and spaced to fit snugly over said projections, and with an intermediate opening registering with the opening in a flat surface, and means for fixing together a channel member and a flat surface, said fixing means consisting of a bolt and a cooperating nut having a sleeve portion fitting into and extending through said openings.

7. A fixture element for space frame structures, comprising a plate having a plurality of spaced seats and inclined gussets connecting said seats, some of said seats being coplanar, and other of said seats being angular with respect to said first named seats, said seats being adapted for receiving and locating strut elements connected thereto.

8. The fixture element of claim 7 and in which each of said seats is provided with an accurately dimensioned and located bolt receiving aperture.

9. The fixture element of claim 7 and in which said plate is of substantially uniform thickness.

10. The fixture element of claim 7 and in which said seats are of substantially the same width.

11. The fixture element of claim 7 and in which at least some of said seats are provided with positioning projections formed integrally thereon.

12. In a load carrying space frame construction system, a space frame structure comprising a lower chord frame structure, an upper chord frame structure, and a stress-distributing web structure spacing and connecting said chord frame structures, each of said chord frame structures comprising a plurality of fixture elements spaced along a plurality of longitudinal and lateral rows and elongated stress carrying channels extending between said fixture elements to form longitudinal and lateral rows of adjacent two-dimensional space modules, the modules of one chord frame structure being longitudinally and laterally offset from the modules of the other chord frame structure, said web structure comprising elongated stress-carrying channels extending between the fixture elements of one chord frame structure and the fixture elements of the other chord frame structure, said channels of both chord frame structures and the web structure being of equal length and bolted to said fixture elements whereby all space modules are the same and all channels are replaceable and interchangeable.

13. The construction system of claim 12 and in which the channels of said chord frame structures and of said web structure are of substantially equal length.

14. The construction system of claim 12 and in which each of said fixture elements is provided with a plurality of seat portions inclined angularly inwardly with respect to said chord frame structure, the channels of said web structure being interchangeably seated on said fixture element seat portions, and connecting means removably securing each end of each channel to a fixture element seat portion.

15. The construction system of claim 14 and in which each channel of said web structure is secured at one end to the outside surface of a fixture element seat portion in one chord frame structure and at the other end to the inside surface of a fixture element seat portion in the other chord frame structure.

16. The construction system of claim 12 and including a column structure supporting said space frame structure above the ground, said column structure comprising four column struts each supported at one end on the ground, a column cap structure supported on the other ends of said column struts, and said lower chord frame structure supported on said column cap structure, said column cap structure comprising four cap fixture elements respectively supported on the tops of said column struts, four strut elements secured to said cap fixture elements to form a single horizontal two dimensional space module, and a column cap web structure comprising strut elements connecting said cap fixture elements with the fixture elements disposed at the corners of four grouped modules of said lower chord frame structure.

17. A fixture element for space frame structures comprising a plate having at least one substantially flat seat adapted for receiving and locating a strut element, said seat having at least one positioning lug of a cylindrical shape and formed integrally with and projecting from one side of said seat and a cylindrical recess in the other side of said seat aligned with said lug, said recess having a larger perimeter than said lug and a volume substantially equal to the volume of material in said lug.

18. In combination with the fixture element defined in claim 17, a strut element having a flat face provided with a recess having a periphery formed complementary with the periphery of the lug projecting from said fixture seat and positioned thereon, and means clamping said strut on said seat.

19. In combination with the fixture element defined in claim 17, a strut element having a flat face provided with a projection formed complementary with the recess in said fixture seat and positioned therein, and means clamping said strut on said seat.

References Cited by the Examiner

UNITED STATES PATENTS

| 820,586 | 5/1905 | Marshall | 189—36 |
| 2,433,677 | 12/1947 | Thomas | 52—82 |
| 2,709,975 | 6/1955 | Parker | 52—649 |

FOREIGN PATENTS

| 117,824 | 11/1943 | Australia. |
| 569,377 | 5/1945 | Great Britain. |
| 661,126 | 11/1951 | Great Britain. |
| 417,497 | 1/1947 | Italy. |

RICHARD W. COOKE, Jr., *Primary Examiner.*

EARL C. DARSCH, CORNELIUS D. ANGEL, JACOB L. NACKENOFF, *Examiners.*